(12) United States Patent
Strashny

(10) Patent No.: US 12,027,290 B2
(45) Date of Patent: *Jul. 2, 2024

(54) RADIAL AND AXIAL INTERFACE BETWEEN CONDUCTOR ROD AND WORK MACHINE

(71) Applicant: Caterpillar Inc., Peoria, IL (US)

(72) Inventor: Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/535,254

(22) Filed: Nov. 24, 2021

(65) Prior Publication Data

US 2023/0162889 A1   May 25, 2023

(51) Int. Cl.
| | |
|---|---|
| *H01B 9/04* | (2006.01) |
| *B60K 1/00* | (2006.01) |
| *B60K 1/04* | (2019.01) |
| *H01B 9/00* | (2006.01) |
| *H01B 9/02* | (2006.01) |
| *H01B 9/06* | (2006.01) |

(52) U.S. Cl.
CPC ............... *H01B 9/006* (2013.01); *B60K 1/00* (2013.01); *B60K 1/04* (2013.01); *H01B 9/026* (2013.01); *H01B 9/0661* (2013.01)

(58) Field of Classification Search
CPC ....................................................... H01B 9/04
USPC ..................................................... 174/24, 28
See application file for complete search history.

(56) References Cited

U.S. PATENT DOCUMENTS

| | | |
|---|---|---|
| 6,750,399 B1 | 6/2004 | Daumling |
| 8,500,473 B2 * | 8/2013 | Fujiwara ............... H01R 25/162 |
| | | 439/213 |
| 8,872,026 B2 | 10/2014 | Guyader et al. |
| 8,925,405 B2 | 1/2015 | Kawabuchi et al. |
| 8,978,852 B2 | 3/2015 | Andre et al. |
| 9,870,845 B2 | 1/2018 | Nagahashi |
| 10,053,096 B2 | 8/2018 | Schunk et al. |

(Continued)

FOREIGN PATENT DOCUMENTS

| | | | |
|---|---|---|---|
| CH | 594294 | * | 1/1978 |
| CN | 201516809 U | | 6/2010 |

(Continued)

OTHER PUBLICATIONS

Written Opinion and International Search Report for Int'l. Patent Appln. No. PCT/US2022/080293, dated Apr. 3, 2023 (8 pgs).

(Continued)

*Primary Examiner* — Chau N Nguyen

(57) ABSTRACT

A work machine, such as a hauler at a mining site, includes a conductor rod housing concentric metal tubes for receiving electrical power from a contactor sliding on a power rail. A head-end interface of the conductor rod proximate the work machine includes metallic rings spaced apart and extending circumferentially around the head-end interface. Bores pass longitudinally through the head-end interface and into cavities within the conductor rod between the concentric metal tubes. The metallic rings enable the delivery of electrical power radially from the conductor rod for powering the work machine, while the bores enable the delivery of pneumatic power longitudinally into the conductor rod for powering axial movement of the conductor rod.

13 Claims, 9 Drawing Sheets

(56) References Cited

U.S. PATENT DOCUMENTS

| | | |
|---|---|---|
| 10,137,785 B2 | 11/2018 | Vahle et al. |
| 10,232,719 B2 | 3/2019 | Tajima |
| 2010/0326942 A1 | 12/2010 | Dahlstrom et al. |
| 2012/0012406 A1 | 1/2012 | Stoicoviciu |
| 2013/0342085 A1 | 12/2013 | Tsui |
| 2014/0345904 A1 | 11/2014 | Nagahashi |
| 2015/0321563 A1 | 11/2015 | Buehs et al. |
| 2016/0264000 A1 | 9/2016 | Zimmerman et al. |
| 2017/0106767 A1 | 4/2017 | Tajima et al. |
| 2017/0166084 A1 | 6/2017 | Tajima |
| 2017/0210238 A1 | 7/2017 | Buehs et al. |
| 2023/0160177 A1* | 5/2023 | Strashny .................. E02F 9/22 439/34 |

FOREIGN PATENT DOCUMENTS

| | | |
|---|---|---|
| CN | 101947920 A | 1/2011 |
| CN | 102785592 B | 11/2012 |
| CN | 204452108 U | 7/2015 |
| CN | 107215238 A | 9/2017 |
| CN | 108340809 A | 7/2018 |
| CN | 211543283 U | 9/2020 |
| EP | 1389818 A1 | 2/2004 |
| EP | 2284635 A | 2/2011 |
| EP | 3812195 A1 | 4/2021 |
| JP | 6691672 B2 | 5/2020 |
| KR | 20110004402 A | 1/2011 |
| KR | 101759368 B1 | 7/2017 |
| KR | 20210027465 A | 3/2021 |
| WO | 2009003765 A1 | 1/2009 |
| WO | WO2009007879 A2 | 1/2009 |
| WO | 2015115474 A1 | 8/2015 |
| WO | WO2020186296 A1 | 9/2020 |

OTHER PUBLICATIONS

Written Opinion and International Search Report for Int'l. Patent Appln. No. PCT/US2022/049878, dated Apr. 3, 2023 (9 pgs).
Written Opinion and International Search Report for Int'l. Patent Appln. No. PCT/US2022/049877, dated Apr. 7, 2023 (9 pgs).
Written Opinion and International Search Report for Int'l. Patent Appln. No. PCT/US2022/080288, dated Apr. 10, 2023 (9 pgs).

* cited by examiner

600

SECURE AT LEAST A PROXIMAL END OF A CONDUCTOR ROD OF CONCENTRICALLY ARRANGED TUBULAR CONDUCTORS TO MULTI-TIERED HEAD-END INTERFACE USING TERMINAL CONNECTORS
602

SECURE AT LEAST A DISTAL END OF THE CONDUCTOR ROD TO A CONNECTOR ASSEMBLY
604

ELECTRICALLY CONNECT THE WORK MACHINE TO THE HEAD-END INTERFACE USING THE TERMINAL CONNECTORS
606

CONNECT THE CONNECTOR ASSEMBLY TO A POWER RAIL PROVIDING ELECTRICAL POWER
608

DELIVER THE ELECTRICAL POWER THROUGH THE TERMINAL CONNECTORS
610

DELIVER PRESSURIZED AIR THROUGH THE PNEUMATIC CONNECTION TO THE BORE
612

```
┌─────────────────────────────────────────────────────────────┐
│  SECURE AT LEAST A PROXIMAL END OF A ROD OF                 │
│  CONCENTRICALLY ARRANGED TUBULAR CONDUCTORS TO A WORK       │
│                         MACHINE                             │
│                           902                               │
└─────────────────────────────────────────────────────────────┘
                              ▼
┌─────────────────────────────────────────────────────────────┐
│  ESTABLISH AN ELECTRICAL CONNECTION WITH TWO OR MORE        │
│  RINGED CONTACTS POSITIONED AROUND THE CIRCUMFERENCE        │
│           OF A HEAD-END INTERFACE ON THE ROD                │
│                           904                               │
└─────────────────────────────────────────────────────────────┘
                              ▼
┌─────────────────────────────────────────────────────────────┐
│  ESTABLISH A PNEUMATIC CONNECTION WITH TWO OR MORE          │
│  BORES POSITIONED AT A LONGITUDINAL END OF THE HEAD-END     │
│                        INTERFACE                            │
│                           906                               │
└─────────────────────────────────────────────────────────────┘
                              ▼
┌─────────────────────────────────────────────────────────────┐
│     CONNECT A DISTAL END OF THE ROD TO A POWER RAIL         │
│               PROVIDING ELECTRICAL POWER                    │
│                           908                               │
└─────────────────────────────────────────────────────────────┘
                              ▼
┌─────────────────────────────────────────────────────────────┐
│  DELIVER THE ELECTRICAL POWER THROUGH THE TWO OR MORE       │
│    RINGED CONTACTS TO THE ELECTRICAL CONNECTION             │
│                           910                               │
└─────────────────────────────────────────────────────────────┘
                              ▼
┌─────────────────────────────────────────────────────────────┐
│   DELIVER PRESSURIZED AIR THROUGH THE PNEUMATIC             │
│     CONNECTION TO THE TWO OR MORE BORES.                    │
│                           912                               │
└─────────────────────────────────────────────────────────────┘
```

*FIG. 9*

RADIAL AND AXIAL INTERFACE BETWEEN CONDUCTOR ROD AND WORK MACHINE

TECHNICAL FIELD

The present disclosure relates to a radial and axial interface between a conductive rod and a work machine. More specifically, the present disclosure relates to a conductive rod having electrical connectors positioned radially and pneumatic connectors positioned axially for interfacing with a work machine, and to an electrically powered work machine coupled electrically and pneumatically to the conductive rod.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but they can have disadvantages. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

Electrical power has been used to supplement these diesel engines while the work machines move. In some environments, the electrical power is delivered from wires over the haul route to a pantograph on the work machine as the machine travels the haul route, as in a cable car. But overhead wires cannot reliably provide sufficient electrical energy to power a heavy work machine during long movements. Nor can the overhead delivery provide enough current to charge backup batteries for an electric machine at the same time. As a result, electrical power through overhead wires typically supplements, rather than replaces, diesel engines in heavy work machines.

Alternatively, a power rail based on the ground may provide electrical power to heavy work machines. An axially moveable cylindrical rod includes at one end an interface with the work machine and at an opposite end a connection with the power rail at the side of a haul route, for example. In some situations, the interface with the work machine not only provides electrical power from the rod to the work machine, but also passes pressurized air from the work machine into the rod for energizing pneumatic controls. In addition, signaling data may need to be passed between the rod and the work machine for electrical sensors or controls. Accommodating these interfaces in a cylindrical rod handling high-voltage electrical power can be challenging.

One approach for providing electrical power through a rod to a traveling vehicle is described in International Patent App. Pub. No. WO 2009/007879A2 ("the '879 application"). The '879 application describes a hybrid transport system in which a rechargeable hybrid vehicle, in some embodiments, has contactors made of round or rectangular tubes that can extend from either side of the vehicle to connect with a metal strip along a roadside providing electrical power. While the contactors can be maneuvered with hydraulic or pneumatic cylinders, the cylinders are distinct from the contactors and can cause the contactors to pivot outwardly from the vehicle about axles. As a result, the contactors described in the '879 application are prone to disconnection from the roadside metal strips, thereby causing temporary interruptions in the flow of electrical power from the metal strips to the vehicle. Such interruptions are undesirable, and may not be permissible in many worksite applications. In particular, the system of the '879 application is not suited for use with machines, such as construction machines, mining machines, paving machines, and the like, requiring relatively high-voltage electrical power for propulsion and other functions.

Examples of the present disclosure are directed to overcoming deficiencies of such systems.

SUMMARY

In an aspect of the present disclosure, an apparatus for conducting electrical energy includes a rigid outer tube with a first end, a second end, an outer diameter, and a longitudinal center defining an axis between the first end and the second end. A first conductor within the rigid outer tube includes a first metal tube surrounding and extending along the axis from proximate the first end to the first metallic endplate and a first metallic endplate having a first longitudinal thickness extending orthogonally from the first metal tube to the outer diameter. A second conductor includes a second metal tube concentrically surrounding and separated from the first metal tube by an annular space and a second metallic endplate. The second metal tube extends from proximate the first end to the second metallic endplate, while the second metallic endplate has a second longitudinal thickness extending orthogonally from the second metal tube to the outer diameter. The second metallic endplate is farther from the second end than the first metallic endplate.

In another aspect of the present disclosure, a conductor assembly includes a first conductor and a second conductor. The first conductor includes a first conductive tube and a first conductive annulus, where the first conductive tube surrounds and extends along a longitudinal axis from a distal end to the first conductive annulus and the first conductive annulus has a first longitudinal thickness extending radially from the first conductive tube to an outer diameter. The second conductor includes a second conductive tube and a second conductive annulus, where the second conductive tube is concentrically inside the first conductive tube and extends from the distal end to the second conductive annulus. The second conductive annulus has a second longitudinal thickness extending radially from the second conductive tube to the outer diameter, and the second conductive annulus is farther from the distal end than the first conductive annulus.

In yet another aspect of the present disclosure, a work machine includes an electric engine, a battery, traction devices configured to cause movement of the work machine when powered by the electric engine, and a conductor rod having a first end and second end and configured to convey electrical energy to the work machine during the movement of the work machine. The conductor rod has a rigid outer tube with an outer diameter and a longitudinal center defining an axis between the first end and the second end. The conductor rod further includes tubular conductors, successively arranged concentrically around the axis and separated, at least in part, by air, and metallic rings. The metallic rings are attached respectively to terminations of the tubular conductors proximate the first end, and individual ones of the metallic rings extend orthogonally from corresponding ones of the tubular conductors to the outer diameter and are spaced apart along the axis.

BRIEF DESCRIPTION OF DRAWINGS

FIG. 6 is a flowchart depicting a method of powering a work machine from a moveable conductor rod using multi-tier head-end interface, in accordance with one or more examples of the present disclosure.

FIG. 9 is a flowchart depicting a method of powering a work machine from a moveable conductive rod in accordance with an example of the present disclosure.

DETAILED DESCRIPTION

Figure 1:
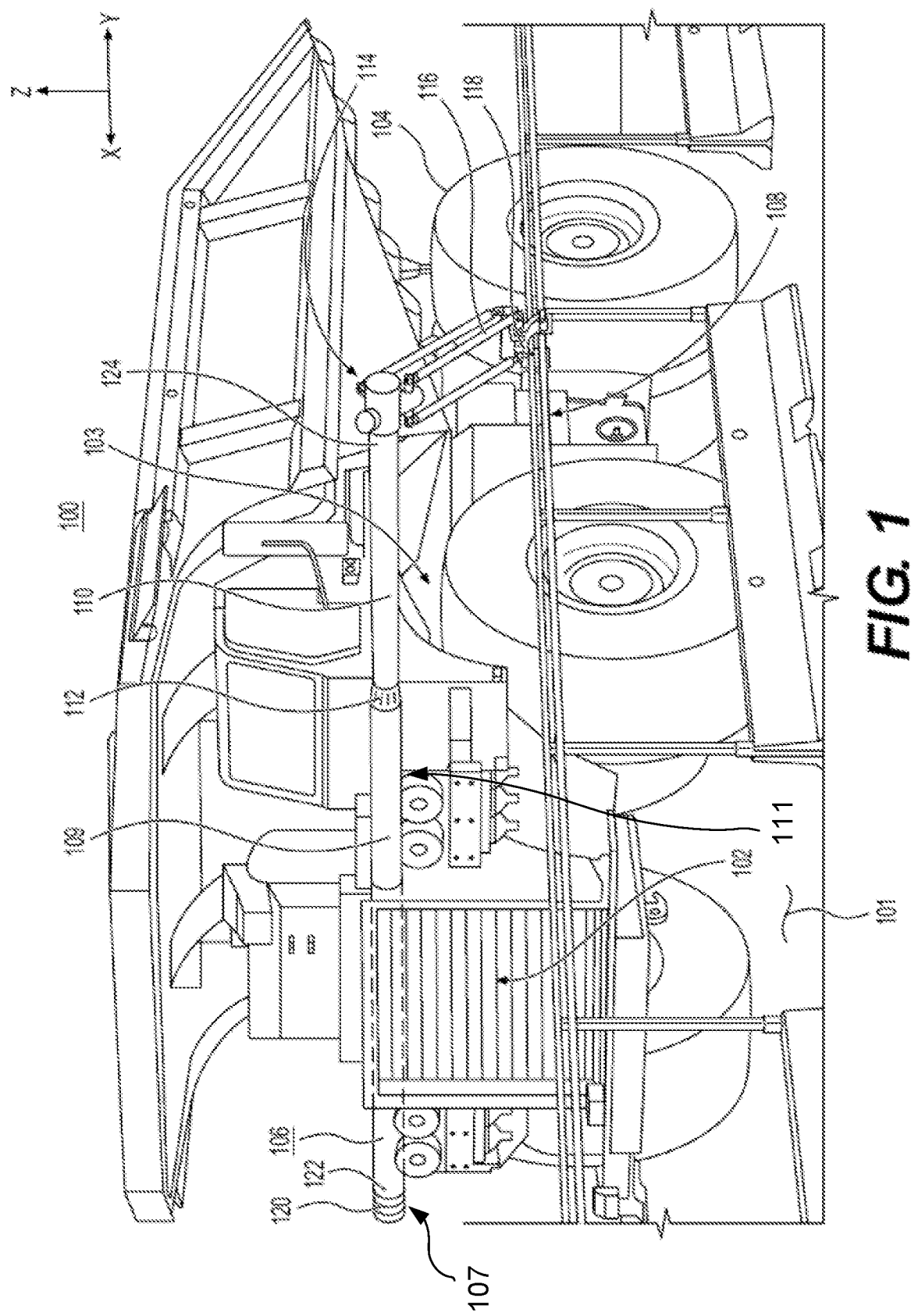
FIG. 1 illustrates an isometric view of a work machine within an XYZ coordinate system as one example suitable for carrying out the principles discussed in the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. The exemplary work machine 100 travels parallel to the X axis along a roadway, also termed a haul route 101, typically from a source to a destination within a worksite. In one implementation as illustrated, work machine 100 is a hauling machine that hauls a load within or from a worksite within a mining operation. For instance, the work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any machine associated with various industrial applications including, but not limited to, mining, agriculture, forestry, construction, and other industrial applications.

Referring to FIG. 1, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. An example of mechanical energy provided by electric engine 102 includes propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, and relevant to the presently disclosed subject matter, the work machine 100 further includes a conductor rod 106 configured to receive electrical power from a power rail 108. In some examples, power rail 108 is one or more beams of metal arranged substantially parallel to and a distance above the ground. In FIG. 1, power rail 108 is positioned to be substantially parallel to the X axis and the direction of travel of work machine 100. Support mechanisms hold power rail 108 in place along a distance at the side of haul route 101 for work machine 100 to traverse. The support mechanisms and power rail 108 may be modular in construction, enabling their disassembly and reassembly at different locations or their repositioning along the existing haul route 101. Moreover, while shown in FIG. 1 to the left of work machine 100 from the perspective of an operator sitting in the cab of the work machine 100, power rail 108 may be disposed to the right of work machine 100 or in other locations suitable to the particular implementation.

Power rail 108 provides a source of electrical power for work machine 100 as either AC or DC. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides 0 volts relative to the other two conductors. The two powered conductors within power rail 108 provide +1500 VDC and −1500 VDC. These values are exemplary, and other physical and electrical configurations for power rail 108 are available and within the knowledge of those of ordinary skill in the art Further, it should be understood that the voltages described herein are merely exemplary, as various levels of AC voltage may be used, as well as a combination of AC and DC voltages, depending on the particular configuration.

Conductor rod 106 enables electrical connection between work machine 100 and power rail 108, including during movement of work machine 100 along haul route 101. In the example shown in FIG. 1, conductor rod 106 is an elongated arm resembling a pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a first end 107 near a right side of work machine 100 and a second end 111 at a left side of work machine 100. Conductor rod 106 may be attached to any convenient location within work machine 100, such as to frame 103, in a manner to couple conductor rod 106 to power rail 108. Shown in FIG. 1 as extending to a left side of work machine 100 toward power rail 108, conductor rod 106 may alternatively be arranged to extend to a right side and at any desired angle from work machine 100 such that conductor rod 106 may be coupled to power rail 108 for obtaining electrical power.

As embodied in FIG. 1, conductor rod 106 includes a barrel 109 mounted to frame 103 of work machine 100. Barrel 109 has a hollow interior and may be a conductive metal having suitable mechanical strength and resiliency, such as aluminum. Within barrel 109, an arm 110 is retained. Arm 110 is engaged within conductor rod 106 along the Y axis in FIG. 1. A length of conductor rod 106 roughly spans the width of work machine 100. A junction 112 serves as the junction or interface between arm 110 and barrel 109, which is the main body of conductor rod 106. When arm 110 is fully retracted or collapsed into barrel 109, junction 112 essentially becomes the left edge of conductor rod 106. On the other hand, when arm 110 is extended from barrel 109 of conductor rod 106, arm 110 may reach from work machine 100 to proximate power rail 108 on the side of haul route 101.

Within, and possibly including barrel 109, conductor rod 106 includes a series of electrical conductors passing longitudinally, at least from a head 122 at a proximal end of the conductor rod 106 to a tip 124 at a distal end of the conductor rod 106. Typically, the conductors within conductor rod 106 are formed of a metallic material and are rigid. In some examples, the conductors are concentric tubes, or hollow cylinders, of solid metal such as copper, aluminum, gold, silver, nickel, zinc, or alloys thereof nested together and sized to provide electrical capacity sufficient for powering work machine 100. Other conductive materials may be used, such as graphite, and are considered to be within the scope of the presently disclosed subject matter. Tubular conductors within arm 110 engage with corresponding tubular conductors within barrel 109 to provide for electrical continuity. In other examples, one or more concentric copper tubes, rather than aluminum, of varying diameters may be used as tubular conductors. Other types of conductive tubes may be used and are within the scope of the presently disclosed subject matter.

At tip 124, a connector assembly 114 provides an interface to power rail 108 via trailing arms 116 and contactor 118. Power rail 108 is typically arranged along a side of haul route 101, and work machine 100 is steered so that it traverses haul route 101 substantially in parallel with power rail 108. Thus, in reference to FIG. 1, power rail 108 and a travel path for work machine 100 are substantially in parallel with each other and with the X axis. Contactor 118 is configured to maintain an electrical connection with power rail 108 while sliding along its surface in the direction of the X axis as work machine 100 moves. In some examples, trailing arms 116 are conductors coupled to contactor 118, each conducting voltage and current at a different electrical pole and corresponding to the conductors within conductor rod 106. In operation, electrical power is accessed from power rail 108 via contactor 118, which remain in contact during movement of work machine 100, and the electrical power is conducted through trailing arms 116 into connector assembly 114.

From connector assembly 114, the electrical power is conveyed at tip 124 through the nested tubular conductors within arm 110 and barrel 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for inputs to control mechanical operation of conductor rod 106.

As noted above, the tubular or cylindrical nature of conductor rod 106, lending to a degree of rigidity greater than a solid conductor of similar or smaller mass or weight to conductor rod 106 due to a larger moment of inertia of a hollow tube than a solid rod of similar mass. Thus, by forming the conductive material into a hollow tube rather than a solid rod, for similar conductive performance, conductor rod 106 can provide a mechanism to conduct electrical power from a source to a load over an unsupported distance. As described above, trailing arms 116 are conductors coupled to contactor 118, each conducting voltage and current at a different electrical pole and corresponding to the conductors within conductor rod 106. Different cylindrical conductors within conducting rod 106 can provide for the transmission of different potentials along conducting rod 106, illustrated in more detail in FIG. 2, below.

Figure 2:
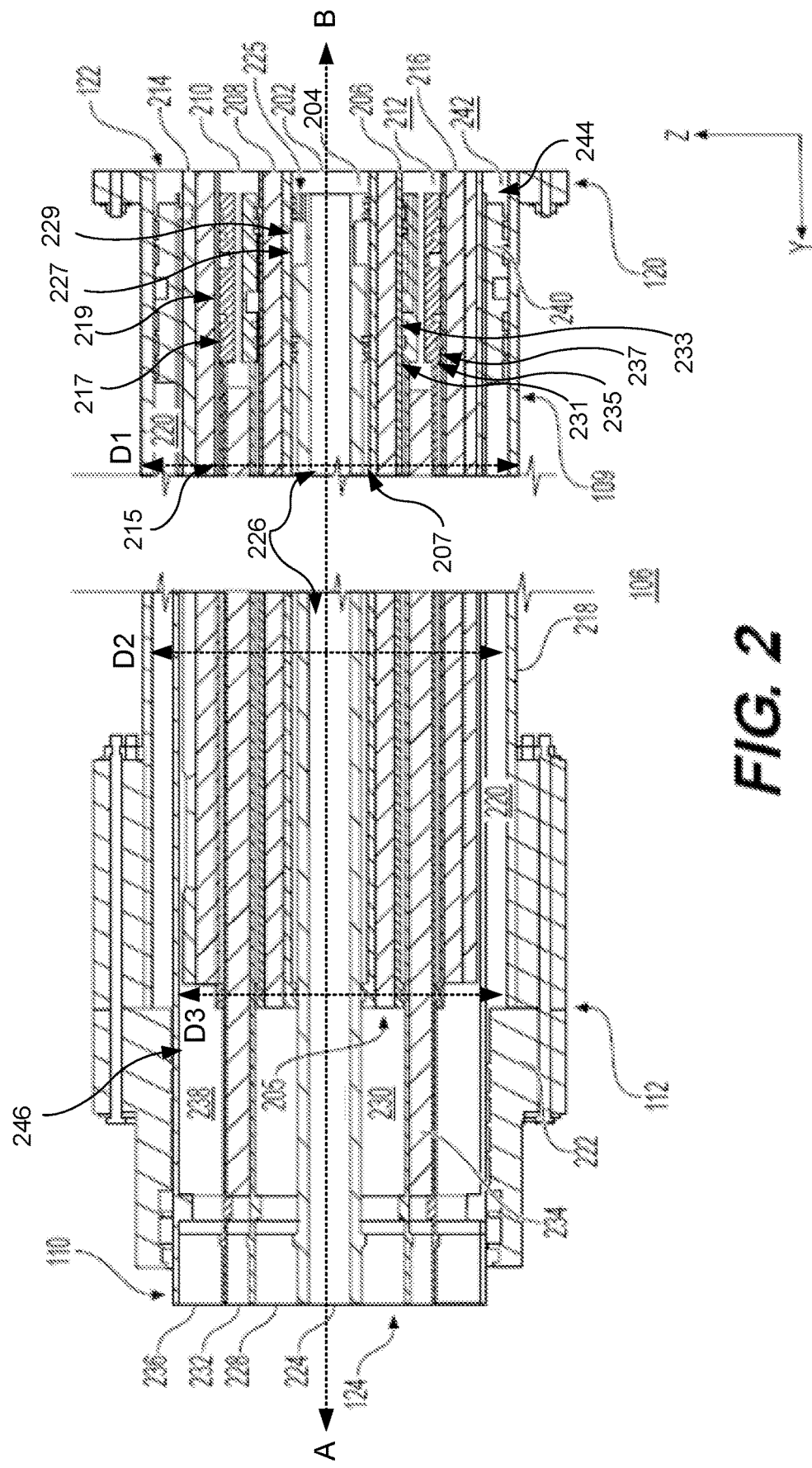
FIG. 2 illustrates a longitudinal section of a conductor rod with an arm disposed in a barrel, in accordance with one or more examples of the present disclosure.

FIG. 2 illustrates a longitudinal cross-section of a section of conductor rod 106 with arm 110 disposed in barrel 109, in accordance with one or more examples of the present disclosure. More specifically, FIG. 2 depicts a longitudinal cross-section of a section of conductor rod 106 between head-end interface 120 and connector assembly 114, from head 122 to tip 124, when viewed facing in the direction of travel for work machine 100, i.e., in the direction of the X axis along. Thus, conductor rod 106 lies in the Y-Z plane, as indicated in FIG. 2.

Referring to the right side of FIG. 2, barrel 109 contains an arrangement of concentric conductors of tubular shape, i.e., as hollow cylinders. In this example, from an axial center AB outward, first cylinder conductor 202 is positioned concentrically along axial center AB (i.e. the longitudinal axis of barrel 109) of barrel 109 and is a tubular conductor made of aluminum or a similar metal with high electrical conductivity and high mechanical strength. For instance, an aluminum alloy such as 6061-T6 may be used for first cylinder conductor 202 and other conductive tubes in conductor rod 106. Other suitable metals or alloys thereof may be used and are considered to be within the scope of the presently disclosed subject matter. In some examples, first cylinder conductor 202 has an outer diameter of approximately 3.5 inches to 4.5 inches. However, it should be understood that dimensions provided herein are merely for purposes of illustration and are not intended to be limitations, as dimensions described in relation to various components may be greater or less than the examples provided herein. First cylinder conductor 202 begins at head 122 and extends axially along conductor rod 106 around axial center AB to a barrel end 205. As a tube, first cylinder conductor 202 defines first cylinder cavity 204 within inner surface 207 of first cylinder conductor 202. If arm 110 were removed from barrel 109 in FIG. 2, first cylinder cavity 204 would be an open space within first cylinder conductor 202 from head 122 to barrel end 205. In one example, first cylinder cavity 204 has a diameter of about 2.5 to 3 inches.

A second cylinder conductor 206 is positioned concentrically along axial center AB and surrounds first cylinder conductor 202. As with first cylinder conductor 202, second cylinder conductor 206 is a tubular conductor made of aluminum or a similar metal with high electrical conductivity and high mechanical strength. Second cylinder conductor 206 is similarly positioned around a Y axis within FIG. 2 and spans a distance from head 122 to barrel end 205. In one example, second cylinder conductor 206 has an outer diameter of about 5 inches to 5.5 inches. These dimensions, as well as other dimensions discussed below, are merely examples and could be greater or lesser than the stated values. Being arranged concentrically around and, by definition, having a larger diameter than first cylinder conductor 202, second cylinder conductor 206 forms a radial gap between it and first cylinder conductor 202. In the example of FIG. 2, that gap is filled by second cylinder insulation 208, which is an insulation comprised of a closed cell polyurethane foam. Other types of materials for second cylinder insulation 208 that provide electrical insulation and lightweight support within conductor rod 106 will be available and apparent to those of ordinary skill in the field. In some examples, second cylinder insulation 208 has a thickness of about 1.5 inches to 0.75 inches.

In some examples, second cylinder insulation 208 can be a dielectric. Dielectric materials can be solids, liquids, or gases. Some solids can be used as dielectrics, such as porcelain, glass, plastics, and the closed cell polyurethane foam described above. In configurations in which a cylinder conductor or piston conductor is hermetically sealed on both ends of the cylinder conductor or piston conductor, fluidic dielectrics can be used in gaps, such as radial gap first cylinder conductor 202 and second cylinder conductor 206. Fluid dielectrics can include some forms of oil or gaseous dielectrics such as air, nitrogen, helium, and other dry gases such as sulfur hexafluoride. In further configurations in which a cylinder conductor or piston conductor is hermetically sealed on both ends of the cylinder conductor or piston conductor, a partial vacuum can be used. In various examples, a partial vacuum can be used as a nearly lossless dielectric even though its relative dielectric constant is unity. It should be noted that the dielectrics disclosed herein are merely examples, as other dielectrics may be used and are considered to be within the scope of the presently disclosed subject matter. Different dielectrics can be used in various radial gaps of conductor rod 106 to allow for different voltages and different types of potentials to be conducted by conductor rod 106. A partial vacuum can be created by pulling air from within a conductor rod, such as from within a cavity, explained in more detail in FIG. 7.

Moving farther out radially on the right side of FIG. 2, third cylinder conductor 210 is positioned concentrically along axial center AB and surrounds second cylinder conductor 206 and first cylinder conductor 202. Third cylinder conductor 210 is a tubular conductor made of aluminum or a similar metal with high electrical conductivity and high mechanical strength. As with the other tubes discussed, third cylinder conductor 210 extends from head 122 to barrel end 205 within conductor rod 106. In one example, third cylinder conductor 210 has an outer diameter of about 8 to 9 inches. A third cylinder cavity 212 between second cylinder conductor 206 and third cylinder conductor 210 is an open space, which, if arm 110 were removed from barrel 109 in FIG. 2, would form a tubular cavity extending from head 122 to barrel end 205.

Concentrically along axial center AB and around third cylinder conductor 210 and the other tubular conductors, fourth cylinder conductor 214 forms an outer conductive path from head 122 to barrel end 205. Similarly, fourth cylinder conductor 214 is a tubular conductor made of an aluminum alloy or a similar metal with high electrical conductivity and high mechanical strength. In one example, fourth cylinder conductor 214 has an outer diameter of about 14 inches. A gap 215 defined as a space between outer surface 217 of third cylinder conductor 210 and an inner surface 219 of fourth cylinder conductor 214, in some examples, is about 0.75 inches and is filled with fourth cylinder insulation 216, which is a closed cell polyurethane foam, dielectric, or similar substance.

Radially beyond fourth cylinder conductor 214, a covering or barrel shell 218 encases conductor rod 106. Barrel shell 218 is typically a metal or similar substance providing structural integrity to conductor rod 106. Barrel shell 218 has an inner diameter in excess of an outer diameter of fourth cylinder conductor 214. As a result, a retraction cavity 220 of a tubular shape is formed between fourth cylinder conductor 214 and barrel shell 218 that extends from head 122 to barrel end 205. A stop 222, which is part of a housing for conductor rod 106 at junction 112, defines a longitudinal end for retraction cavity 220 away from head 122.

The various annular or tubular cavities within barrel 109, namely, first cylinder cavity 204, third cylinder cavity 212, and the head end of retraction cavity 220 (barrel shell cavity 242, described below), are sealed or capped by the attachment of head-end interface 120 to their ends at head 122. The attachment of head-end interface 120 is designed to provide an airtight (or hermetic) seal within these cavities, for purposes to be understood further below.

Viewing FIGS. 1 and 2 together, arm 110 is a substantially cylindrical body having an outer diameter D1 that is smaller than inner diameter D2 of barrel shell 218, allowing arm 110 to slidable engage into barrel 109. As well as providing a longitudinal end for retraction cavity 220, stop 222 also defines an inner diameter D3 through which arm 110 slides, as shown to the left of FIG. 2. By sliding, it is meant that arm 110 may move longitudinally along the Y axis within barrel 109 as arm 110 is moved axially with respect to conductor rod 106, from left to right in FIG. 2 for retraction and from right to left in FIG. 2 for extension. The result of the sliding is the increase or decrease in the overall length of conductor rod 106 via arm 110, as illustrated in FIG. 1.

Referring now to the left side of FIG. 2, arm 110 also contains a series of concentric conductors of cylindrical or tubular shape. In this example, from the axial center outward, first piston conductor 224 is positioned at a center of arm 110 and is, as with the other tubular conductors of arm 110, made of a metal such as aluminum 6061-T6 or similar substance having high electrical conductivity and high mechanical strength. First piston conductor 224 extends from tip 124 to an arm end 225, shown at the right side of FIG. 2. Being tubular, first piston conductor 224 has a first piston cavity 226 within its inner diameter that is filled with air or another gas. A second piston conductor 228 concentrically surrounds first piston conductor 224 and extends from tip 124 to arm end 225. Second piston conductor 228 is made of a conductive material, and in some examples has an inner diameter of between about 5 and 6 inches. A space defined as second piston cavity 230 is formed between the inner diameter of second piston conductor 228 and the outer diameter of first piston conductor 224, which is left unfilled other than with air or a similar gas.

Moving radially outward from second piston conductor 228, a third piston conductor 232 axially centered on the Y axis concentrically surrounds second piston conductor 228. Similarly made of a conductive material, third piston conductor 232 is set off radially from second piston conductor 228 a distance of less than 1 inch, which is filled with a third piston insulation 234. As with second cylinder insulation 208 and fourth cylinder insulation 216, third piston insulation 234 can be a closed cell polyurethane foam or comparable substance providing electrical insulation and lightweight stability. An arm shell 236 of conductive material such as metal concentrically surrounds third piston conductor 232 from tip 124 to about arm end 225. In some examples, arm shell 236 has an outer diameter of about 11.625 inches. Within an inner diameter of arm shell 236, an arm shell cavity 238 of free space exists between arm shell 236 and third piston conductor 232.

In some examples, the outer surface of arm shell 236 includes gasket 240, which serves to stably set apart arm shell 236, and arm 110 generally, from barrel shell 218. As illustrated in FIG. 2, as arm 110 is retracted or extended within barrel 109, gasket 240 separates retraction cavity 220 from a barrel shell cavity 242. As well, gasket 240 can help retain arm 110 within conductor rod 106 in a state of maximum extension by butting against stop 222.

As illustrated, FIG. 2 represents an arrangement in which conductor rod 106 essentially has two longitudinal halves. It should be noted, however, that a conductor rod of the presently disclosure does not require multiple halves, illustrated in FIG. 3, below. Returning to FIG. 2, a first half, barrel 109, on the right side of FIG. 2, includes barrel shell 218 enclosing a series of tubular cylinder conductors aligned along the Y axis. Those cylinder conductors, viewed radially from axial center AB, are first cylinder conductor 202, second cylinder conductor 206, third cylinder conductor 210, and fourth cylinder conductor 214. Within that concentric arrangement, tubular regions of open space exist within first cylinder cavity 204 and third cylinder cavity 212. Further, barrel shell 218 encases barrel 109 and forms an open space 244 within retraction cavity 220 and barrel shell cavity 242. On the left side of FIG. 2, arm 110 includes arm shell 236 enclosing a series of tubular piston conductors also aligned along axial center AB of conductor rod 106. Those piston conductors, viewed radially from axial center AB, are first piston conductor 224, second piston conductor 228, and third piston conductor 232. Within that concentric arrangement, tubular regions of open space exist within first piston cavity 226 and second piston cavity 230. Further arm shell 236 encases arm 110 and forms an open space 246 within arm shell cavity 238.

In an operating state for conductor rod 106, arm 110 is inserted into barrel 109 to form a nested configuration of the piston conductors and the cylinder conductors. For example, when arm 110 is inserted into barrel 109, the outer surface 227 of first piston conductor 224 fits within an internal space formed by an inner surface 229 of first cylinder conductor 202. During operation, first piston conductor 224 maintains electrical contact with first cylinder conductor 202, permitting electrical conductivity between those tubular conductors. When first piston conductor 224 is mated within first cylinder conductor 202, first piston cavity 226 and first cylinder cavity 204 connectively extend axially through conductor rod 106 from head 122 to tip 124.

Similarly, when the combination of second piston conductor 228, third piston conductor 232, and interposed third piston insulation 234 are slid as part of arm 110 into barrel 109, an outer surface 231 of third piston conductor 232 fits within an inner surface 233 of third cylinder conductor 210, and an inner surface 235 of second piston conductor 228 fits over an outer surface 237 of second cylinder conductor 206. As a result, second piston conductor 228, third piston conductor 232, and third piston insulation 234 are disposed in the empty space defined by third cylinder cavity 212. In this configuration, third piston conductor 232 electrically contacts third cylinder conductor 210, and second piston conductor 228 electrically contacts second cylinder conductor 206. In some examples, and as shown similarly in FIG. 2, when conductor rod 106 is fully collapsed, at least some volume of empty space will remain within third cylinder cavity 212, which will have an annular or tubular shape and be defined radially by portions of second cylinder conductor 206 and third cylinder conductor 210.

Conversely, when arm 110 is inserted into barrel 109, the cylinder conductors will be disposed within cavities within the piston from left to right in FIG. 2, and the cylinder conductors are nested with the piston conductors. For example, the combination of first cylinder conductor 202, second cylinder conductor 206, and second cylinder insulation 208 are in the open space defined by second piston cavity 230 within arm 110, during which, as mentioned, first cylinder conductor 202 electrically contacts first piston conductor 224 and second cylinder conductor 206 electrically contacts second piston conductor 228. Likewise, in the illustrated example, the sandwich of third cylinder conductor 210, fourth cylinder conductor 214, and fourth cylinder insulation 216 are in the open space defined by arm shell cavity 238 within arm 110. Third cylinder conductor 210 will contact third piston conductor 232, and fourth cylinder conductor 214 will do the same against arm shell 236.

As mentioned above, head-end interface 120 provides at least an electrical connection between conductor rod 106 and work machine 100 for powering electric engine 102 and otherwise enabling operations within work machine 100. Head-end interface 120 also provides the physical securement of first cylinder conductor 202, second cylinder conductor 206, third cylinder conductor 210, and fourth cylinder conductor 214 to work machine 100, allowing arm 110 to extend and retract in relation to conductor rod 106, illustrated in more detail in FIGS. 3 and 4, below.

Figure 3:
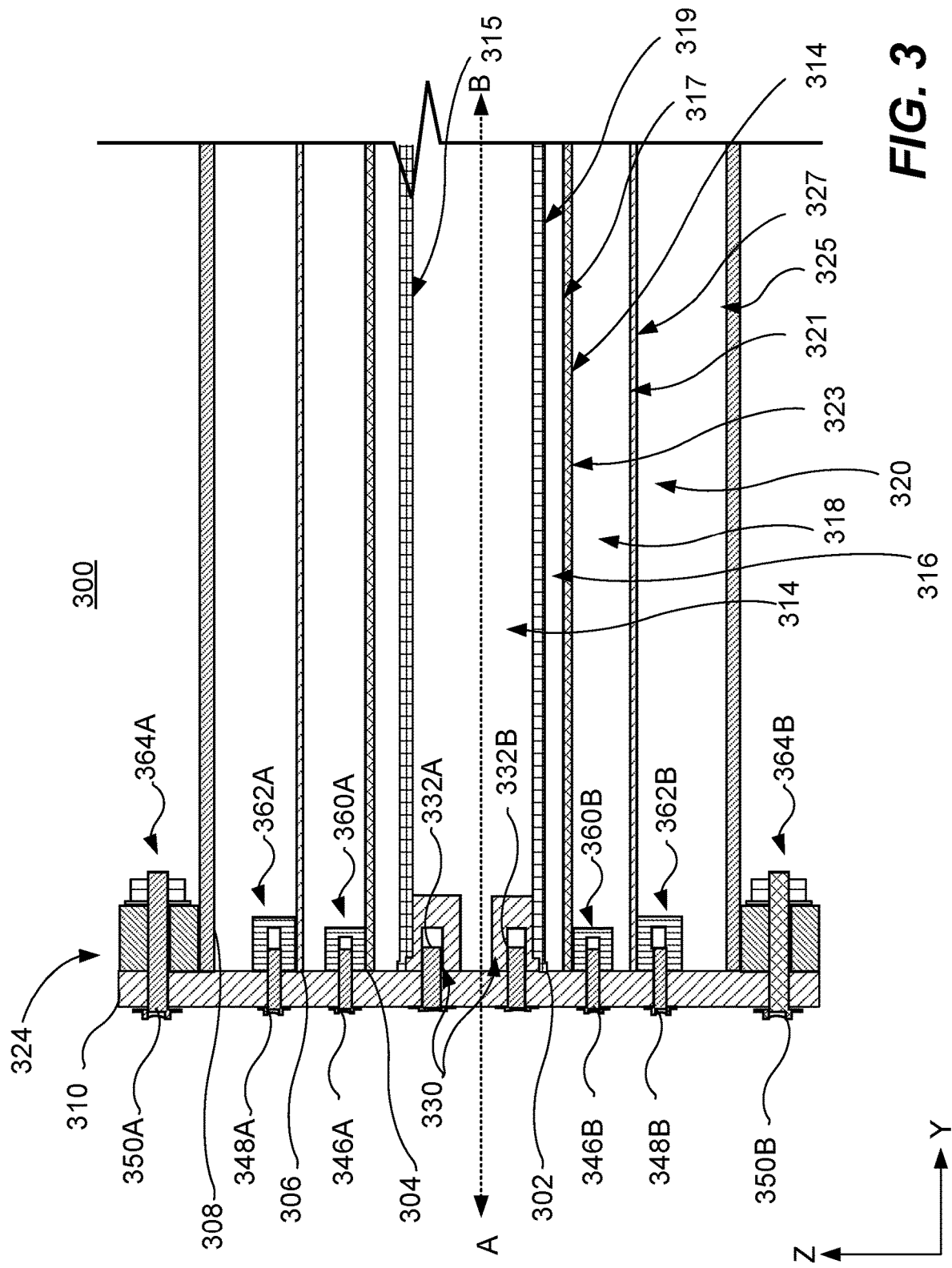
FIG. 3 is a longitudinal cross-sectional view of a conductor rod and a connector assembly, in accordance with one or more examples of the present disclosure.

FIG. 3 is a longitudinal cross-sectional view of a conductor rod 300 on the side of a tip 324 proximate to connector assembly 312, in accordance with one or more examples of the present disclosure. For purposes of simplicity, only the side of conductor rod 300 proximate to connector assembly 312 is illustrated, though the technologies and techniques described in FIG. 3 and below are applicable to conductor rod 300 proximate to a head-end interface, such as head-end interface 120 of FIGS. 1 and 2. FIG. 3 depicts a longitudinal cross-sectional of a portion of conductor rod 300 when viewed facing in the direction of travel for a work machine, such as work machine 100 of FIG. 1, i.e., in the direction of the X axis. Thus, conductor rod 300 lies in the Y-Z plane, as indicated in FIG. 3. Conductor rod 300 includes first cylinder conductor 302, second cylinder conductor 304, third cylinder conductor 306, and barrel 308. Conductor rod 300 includes connector assembly 312. Similar to the conductor rod 106 of FIG. 1, connector assembly 312 is located proximate to a power supply to conduct power from the power supply to work machine 100 (or load).

First cylinder conductor 302, second cylinder conductor 304, and third cylinder conductor 306 are concentric conductors of tubular shape, i.e. as hollow cylinders. In FIG. 3, from axial center CD outward, first cylinder conductor 302 is positioned at a center of barrel 308. Second cylinder conductor 304 concentrically surrounds first cylinder conductor 302. As with first cylinder conductor 302, second cylinder conductor 304 is a tubular conductor made of aluminum or a similar metal with high electrical conductivity and high mechanical strength. Second cylinder conductor 304 is similarly positioned concentrically around axial center CD. Moving farther out radially, third cylinder conductor 306 concentrically surrounds second cylinder conductor 304 and first cylinder conductor 302. Concentrically around third cylinder conductor 306 and the other tubular conductors, barrel 308 forms an outer conductive path. In some examples, barrel 308 can act as a fourth cylinder conductor if constructed from a conductive material. First cylinder conductor 302, second cylinder conductor 304, third cylinder conductor 306, and barrel 308 span a distance from head-end interface 310 to connector assembly 312. Radially beyond fourth cylinder conductor 214, barrel 308 encases conductor rod 300. Barrel 308 is typically a metal or similar substance providing structural integrity to conductor rod 300. However, in some examples, barrel 308 is a non-conductive material that isolations the electrically energized interior of conductor rod 300 from an environment. Barrel 308 has an inner diameter in excess of an outer diameter of fourth cylinder conductor 214.

As tubes, first cylinder conductor 302 defines first cylinder cavity 314 within inner surface 315 of first cylinder conductor 302, second cylinder conductor 304 defines second cylinder cavity 316 between inner surface 317 of second cylinder conductor 304 and outer surface 319 of first cylinder conductor 302, third cylinder conductor 306 defines third cylinder cavity 318 between inner surface 321 of third cylinder conductor 306 and outer surface 323 of the second cylinder conductor 304, and barrel 308 defines fourth cylinder cavity 320 between inner surface 325 of barrel 308 and outer surface 327 of the third cylinder conductor 306. First cylinder cavity 314, second cylinder cavity 316, third cylinder cavity 318, and/or fourth cylinder cavity 320 can be filled with insulative materials such as closed cell polyurethane foam. In other examples, first cylinder cavity 314, second cylinder cavity 316, third cylinder cavity 318, and/or fourth cylinder cavity 320 are filled with a dielectric. Dielectric materials can be solids, liquids, or gases. Some solids can be used as dielectrics, such as porcelain, glass, plastics, and the closed cell polyurethane foam described above. In configurations in which a cylinder conductor is hermetically sealed on both ends of cylinder conductor 300, fluidic dielectrics can be used in cavities, First cylinder cavity 314, second cylinder cavity 316, third cylinder cavity 318, and/or fourth cylinder cavity 320. Fluid dielectrics can include some forms of oil or gaseous dielectrics such as air, nitrogen, helium, and other dry gases such as sulfur hexafluoride. In further configurations in which a cylinder conductor or piston conductor is hermetically sealed on both ends of the cylinder conductor or piston conductor, a partial vacuum can be used. In various examples, a partial vacuum can be used as a nearly lossless dielectric even though its relative dielectric constant is unity. It should be noted that the dielectrics disclosed herein are merely examples, as other dielectrics may be used and are considered to be within the scope of the presently disclosed subject matter.

Different dielectrics can be used in various cylinder cavities of conductor rod 300 to allow for different voltages and different types of potentials to be conducted by conductor rod 300. For example, first cylinder conductor 302 and second cylinder conductor 304 can be configured to conduct a DC voltage and third cylinder conductor 306 can be configured to conduct an AC voltage. Because both first cylinder conductor 302 and second cylinder conductor 304 are conducting DC voltage, there may be no need or requirement to have a dielectric other than air between first cylinder conductor 302 and second cylinder conductor 304. However, if the AC voltage being carried on third cylinder conductor 306 is of a certain voltage level or frequency, a dielectric of suitable strength can be used to prevent a short between second cylinder conductor 304 and third cylinder conductor 306.

The various annular or tubular cavities within barrel 308, namely, first cylinder cavity 314, second cylinder cavity 316, third cylinder cavity 318, and/or fourth cylinder cavity 320, are sealed or capped by the attachment of the ends of the cylinder conductors to an interface. In FIG. 3, the interface is connector assembly 312, though the same technology and techniques can be used to attach the other ends of cylinder conductors to another interfaces, such as head-end interface 120 of FIG. 2. The attachment is designed to provide an airtight (or hermetic) seal within these cavities. For example, when using fluidic insulative materials or dielectrics, or a partial vacuum, a hermetic seal maintains the fluid within the particular cavity to which the fluid is inserted, or, maintains the partial vacuum from which the air was pumped out. To provide for an airtight seal, the ends of the cylinder conductors can be affixed to interfaces using various technologies, including welding, glue, adhesive, gaskets, and the like. To removably affix the ends of the cylinder conductors, whereby the ends can be installed, removed, and reinstalled, the cylinder conductors can use a terminal connector assembly. The terminal connector assemblies use a threaded member inserted into a terminal receiver. The terminal receiver is affixed to a respective cylinder conductor, thereby providing for affixing and removing the cylinder conductors from either a head-end interface, such as head-end interface of FIGS. 1 and 2, or connector assembly 312.

In FIG. 3, first cylinder conductor 302 is affixed to head-end interface 310 using terminal connector assembly 330 and threaded members 332A and 332B. Threaded members 332A and 332B are inserted through head-end interface 310 and into terminal connector assembly 330. Second cylinder conductor 304 is affixed to head-end interface 310 using terminal connector assembly 360A and 360B and threaded members 346A and 346B. Threaded members 346A and 346B are inserted through head-end interface 310 and into terminal connector assembly 360A and 360B. Third cylinder conductor 306 is affixed to head-end interface 310 using terminal connector assembly 362A and 362B and threaded members 348A and 348B. Threaded members 348A and 348B are inserted through head-end interface 310 and into terminal connector assembly 362A and 362B. Barrel 308 is affixed to head-end interface 310 using terminal connector assembly 364A and 364B and threaded members 350A and 350B. Threaded members 350A and 350B are inserted through head-end interface 310 and into terminal connector assembly 364A and 364B.

In FIG. 3, threaded members 332A/332B, 346A/346B, 348A/348B, and/or 350A/350B are used to provide electrical power from their respective conductor cylinders to a load, such as work machine 100. It is noted that threaded members 350A and 350B may provide electrical power or may be connected to a ground, such as work machine 100. However, as illustrated in FIG. 3, threaded members 332A/332B, 346A/346B, 348A/348B, and/or 350A/350B are disposed substantially along the same plane or the Z axis. In some examples, however, threaded members may be disposed on different planes of a head-end connector, as illustrated by example in FIG. 4.

Figure 4:
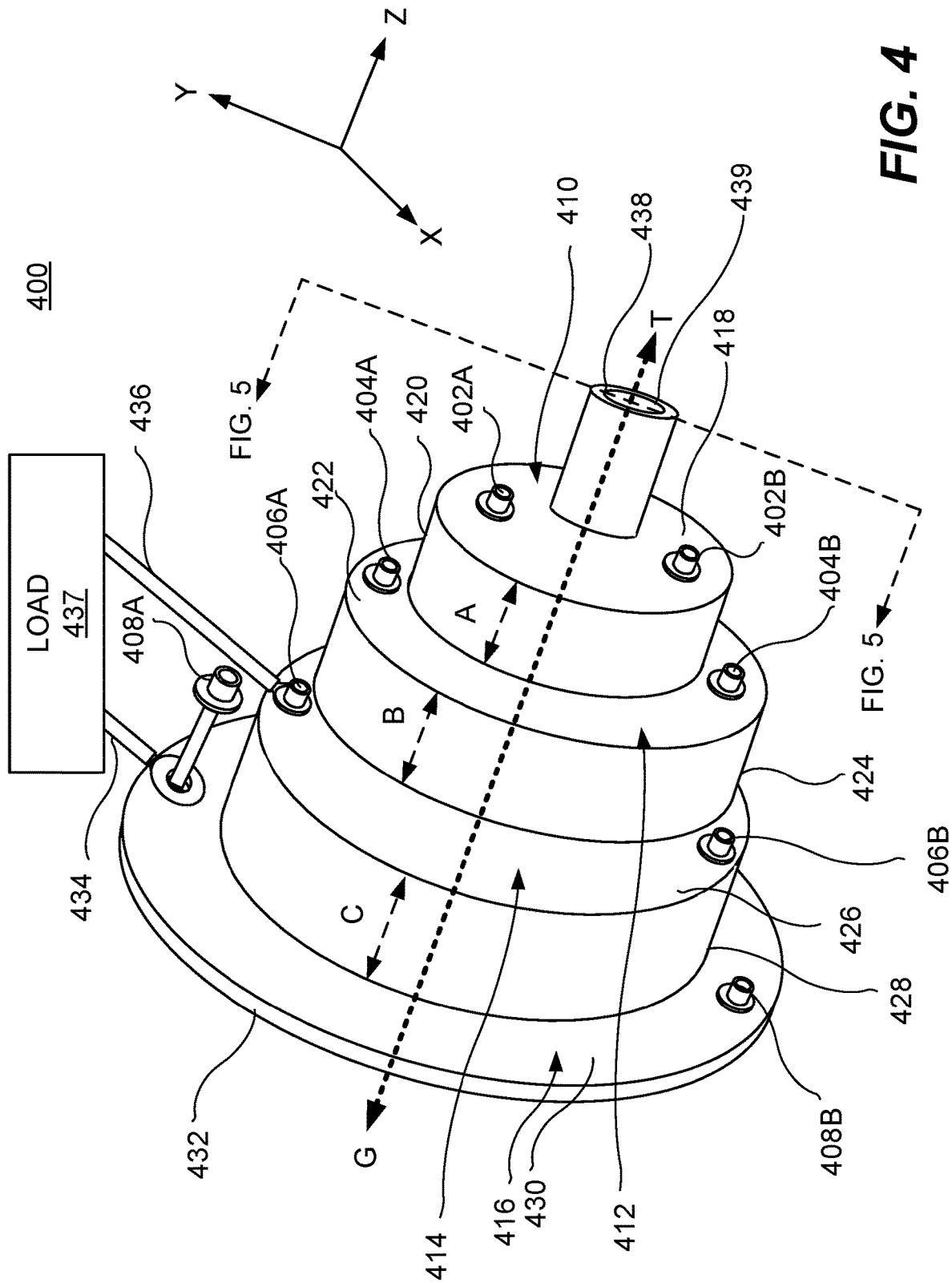
FIG. 4 is an isometric view of a head-end interface having multiple tiers, in accordance with one or more examples of the present disclosure.

FIG. 4 is an isometric view of a head-end interface 400 having multiple tiers, in accordance with one or more examples of the present disclosure. Head-end interface 400 is within an XYZ coordinate system. Head-end interface 400 can be used as head-end interface 120 of FIG. 1. Head-end interface 400 may be constructed of various types of materials, including metals, ceramics, and plastic. If constructed of a metal, head-end interface 400 may be coated with an insulative material to prevent electrical shorts. Head-end interface 400 includes structural features that enable electrical connection with a conductor rod, such as conductor rod 300 of FIG. 3, using threaded members. Head-end interface 400 provides access for passing electrical power from a conductor rod to a work machine, such as work machine 100. Head-end interface 400 is shown illustrated with threaded members 402A and 402B, 404A and 404B, 406A and 406B, and 408A and 408B. Threaded members 402A and 402, 404A and 404B, 406A and 406B, and 408A and 408B are constructed in a manner similar to threaded members of FIG. 3. Threaded member 408A is shown in FIG. 4 as being partially extracted from head-end interface 400. As illustrated in FIG. 4, load 437 can receive electrical power through electrical connector 434 connected to head-end interface 400 by threaded member 408A. Load 437 can also receive electrical power through electrical connector 436. In some examples, if threaded member 408A is connected to a barrel or outer tube, rather than being connected to load 437, electrical connector may be connected to a ground.

Head-end interface 400 includes one or more tiers, for example tiers 410-416, that are disposed above each other longitudinally along the Z axis, which in FIG. 4, are generally circular in shape. Head-end interface 400 includes a central axis GT that extends through the center of head-end interface 400 in the direction of the Z axis. Tier 410 is defined by a substantially planar surface 418 extending substantially perpendicular to the central axis GT. The tier 410 also includes a riser section 420 extending substantially perpendicularly from the surface 418. The riser section 420 comprises a substantially cylindrical outer wall of the tier 410, and the central axis GT extends substantially centrally through the surface 418 and the riser section 420. As shown in FIG. 4, the tier 410 has an axial height A as measured from the surface 418 to a substantially planar surface 422 of the tier 412. In some examples, the height A of the tier 410 comprises an axial height of the substantially cylindrical riser section 420. Tier 412 is defined by a substantially planar surface 422 extending substantially perpendicular to the central axis GT. The tier 410 also includes a riser section 424 extending substantially perpendicularly from the surface 422. The riser section 424 comprises a substantially cylindrical outer wall of the tier 412, and the central axis GT extends substantially centrally through the surface 422 and the riser section 424. As shown in FIG. 4, the tier 412 has an axial height B as measured from the surface 422 to a substantially planar surface 426 of the tier 414. In some examples, the height B of the tier 412 comprises an axial height of the substantially cylindrical riser section 424. Tier 414 is defined by a substantially planar surface 426 extending substantially perpendicular to the central axis GT. The tier 414 also includes a riser section 428 extending substantially perpendicularly from the surface 426. The riser section 428 comprises a substantially cylindrical outer wall of the tier 414, and the central axis GT extends substantially centrally through the surface 426 and the riser section 428. As shown in FIG. 4, the tier 414 has an axial height C as measured from the surface 426 to a substantially planar surface 430 of the tier 416. In some examples, the height C of the tier 414 comprises an axial height of the substantially cylindrical riser section 428. In some examples, height A, height B, and height C are substantially the same or similar. In other examples, height A, height B and/or height C can be different from each other.

Threaded members 402A and 402 are located on tier 410. Threaded members 404A and 404B are located on tier 412. Threaded members 406A and 406B are located on tier 414. Threaded members 408A and 408B are located on tier 416. Head-end interface 400 is shown with bore 438. Bore 438 is an annular space 439 in head-end interface 400 that extends through head-end interface 400 and provides an opening through head-end interface 400 into which fluids such as air may be introduced or removed. Bore 438 cylindrical structure extending substantially perpendicularly from surface 418 along axis GT, 438. Bore 438 through annular space 439 is a channel extending substantially centrally through head-end interface 400 formed by the structure to some other location (not shown). For example, bore 438 may be used to deliver pressurized air within a conductor rod. In some examples, the pressurized air provides an axial force that can affect a movement of a conductor rod.

Head-end interface 400 provides for a multi-tier interface to which cylinder conductors may be affixed. Threaded members can be physically and electrically connected to respective conductive cylinders to transfer electrical energy received from a power source, through one or more piston conductors and cylinder conductors, and into their respective terminal connectors, illustrated by way of example in FIG. 5, which uses head-end interface 400 connected to conductor rod 300 of FIG. 3.

Figure 5:
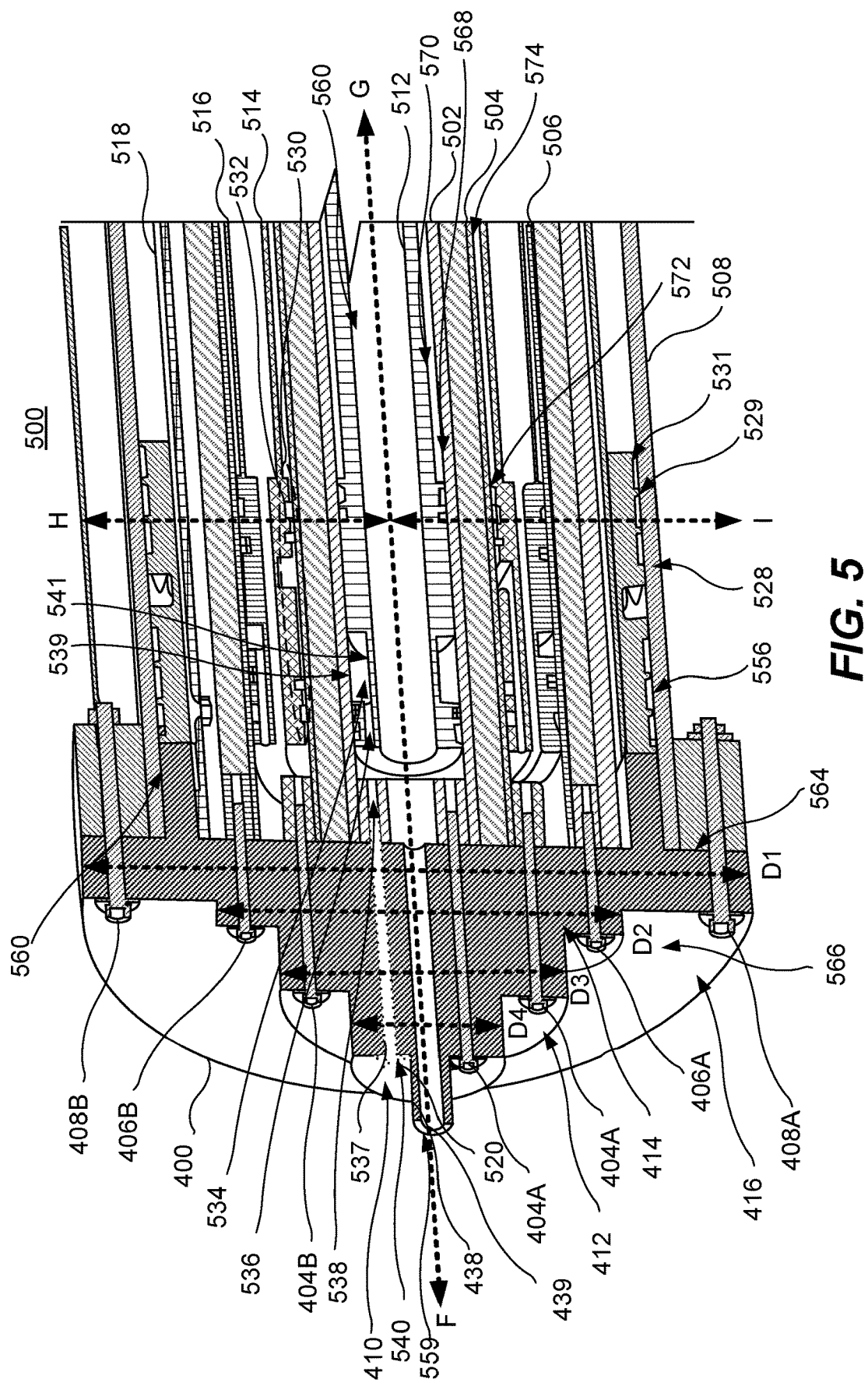
FIG. 5 is an isometric cross-sectional view of a portion of a conductor rod with head-end interface, along the cut lines shown in FIG. 4, in accordance with one or more examples of the present disclosure.

FIG. 5 is an isometric cross-sectional partial view of a conductor rod 500 with head-end interface 400 along the cut lines shown in FIG. 4 revealing internal conductors, as discussed below, in accordance with one or more examples of the present disclosure. Head-end interface 400 is physically and electrically connected to conductor rod 300 of FIG. 3. Threaded members 402A and 402B are located on tier 410. Threaded members 404A and 404B are located on tier 412. Threaded members 406A and 406B are located on tier 414. Threaded members 408A and 408B are located on tier 416. Conductor rod 500 includes first cylinder conductor 502, second cylinder conductor 504, third cylinder conductor 506, and barrel 508. First cylinder conductor 502, second cylinder conductor 504, third cylinder conductor 506, and barrel 508 are mechanically affixed to head-end interface 400. Conductor rod 500 further includes first piston conductor 512, second piston conductor 514, third piston conductor 516, and arm 518.

In some examples, tier 416 has a diameter D1 through axial length FG defined by the substantially cylindrical riser section 428 and/or by the substantially planar surface 430 (FIG. 4), tier 414 has a diameter D2 through axial length FG defined by the substantially cylindrical riser section 428 and/or by the substantially planar surface 426 (FIG. 4) that is less than diameter D1, tier 412 has a diameter D3 through axial length FG defined by the substantially cylindrical riser section 424 and/or by the substantially planar surface 422 (FIG. 4) that is less than diameter D1 and diameter D2, and tier 410 has a diameter D4 through axial length FG defined by the substantially cylindrical riser section 420 and/or by the substantially planar surface 418 (FIG. 4) that is less than diameter D1, diameter D2, and diameter D3.

An inner surface 568 of first cylinder conductor 502 concentrically surrounds and is slidably engaged with an outer surface 570 of first piston conductor 512 from radius HI along axial length FG. An inner surface 572 of second piston conductor 514 concentrically surrounds is slidably engaged with an outer surface 574 of second cylinder conductor 504 from radius HI along axial length FG. Third cylinder conductor 506 concentrically surrounds third piston conductor 516 from radius HI along axial length FG. Barrel 508 concentrically surrounds arm 518 from radius HI along axial length FG. First piston conductor 512, second piston conductor 514, third piston conductor 516, and arm 518 are insertable into and retractable from first cylinder conductor 502, second cylinder conductor 504, third cylinder conductor 506, and barrel 508. First cylinder conductor 502 is mechanically affixed to internal surface 564 of head-end interface 400 tier 410 by threaded members 402A and 402B extending from an outer surface 566 of head-end interface 400 thru internal surface 564 and into first cylinder conductor 502. Second cylinder conductor 504 is mechanically affixed to internal surface 564 of head-end interface 400 tier 412 by threaded members 404A and 404B extending from outer surface 566 of head-end interface 400 thru internal surface 564 and into second cylinder conductor 504. Third cylinder conductor 506 is mechanically affixed to internal surface 564 of head-end interface 400 tier 414 by threaded members 406A and 406B extending from outer surface 566 of head-end interface 400 thru internal surface 564 and into third cylinder conductor 506. Barrel 508 is mechanically affixed to internal surface 564 of head-end interface 400 tier 416 by threaded members 408A and 408B extending from outer surface 566 of head-end interface 400 thru internal surface 564 and into barrel 508. In use, if the outermost tube, barrel 508 acts as a rigid outer tube of conductor rod 500.

Piston conductors 512-516 and arm 518 are in electrical and physical communication with their respective cylinder conductors 502-506 and barrel 508 via one or more conducting interfaces. For example, a conducting interface 528 comprises a contacting interface between an exterior contacting surface 529 of arm 518 and an interior contacting surface 531 of barrel 508. Conducting interface 528 provides both a slidable physical interface as well as an electrical interface between barrel 508 and arm 518. Acting as an electrical interface, electrical power is transferred from piston conductors 512-516 to their respective cylinder conductors 502-506, allowing for the continuous transfer of electrical power while the conductor rod 500 extends and retracts. Various technologies may be used to provide for a physical and electrical interface. Arm 518 extends and retracts by sliding along the conducting interface 528, maintaining a physical and electrical interface. In FIG. 5, the interface is head-end interface 400, though the same technology and techniques can be used to attach piston conductors 512-516 to connector assembly 114 of FIG. 1 using threaded members. The attachment is designed to provide an airtight (or hermetic) seal within these cavities.

Another example of a conducting interface is conducting interface 530. Rather than direct contact between a cylinder conductor and a piston conductor acting as an electrical and physical interface, conducting interface 530 uses carbon brushes, such as brush 532. Brush 532 is a solid material formed from a conductive material, such as carbon or graphite, that provides both a physical and electrical interface between second cylinder conductor 504 and second piston conductor 514. Brush 532 may be formed by compacting a mix of materials such as carbon, graphite, and metallic power (e.g. copper) into a solid piece of material sized and shaped to be used in conducting interface 530.

Another example of an electrical interface material that provides for the conduction of electrical power from a piston conductor to a cylinder conductor is a metallic alloy that is liquid at a certain temperature, such as room temperature. An example of a metallic alloys is GALINSTAN. GALINSTAN is a eutectic alloy composed of gallium, indium, and tin which melts at −19 C (−2 F) and is thus liquid at room temperature. It should be noted, however, that other metal allows with properties similar to GALINSTAN may be used and are considered to be within the scope of the presently disclosed subject matter.

In order to keep a metallic alloy at an interface, the metallic alloy will be contained within a space enclosed by the surfaces of the piston conductor and the cylinder conductor in which the liquid alloy is being used. For example, conducting interface 534 is a space defined by an interior surface 539 of first cylinder conductor 502 and an exterior surface 541 of first piston conductor 512. Conducting interface 534 is configured to act as a fluidic barrier, reducing or eliminating potential leaks of the liquid metallic alloy contained therein into other areas of the conductor rod 500. As first piston conductor 512 extends and retracts within first cylinder conductor 502, conducting interface 534 with a liquid metallic alloy contained therein provide for a constant electrical connection between first cylinder conductor 502 and first piston conductor 512.

During use, the conducting interface 534 may be filled with additional liquid metallic alloy. FIG. 5 illustrates one manner in which this may be accomplished, though other technologies for filling or refilling conducting interface 534 with additional liquid metallic alloy may be used and are considered to be within the scope of the presently disclosed subject matter. In FIG. 5, to introduce a liquid metallic alloy into conducting interface 534, piston channel 536, and interface channel 538 are used. To introduce a liquid metallic alloy into conducting interface 534, conductor rod 500 is in a retracted configuration so that first piston conductor 512 abuts or nearly abuts interface channel 538 so that interface channel 538 is in liquid communication with piston channel 536. Terminal connector 520 is removed, creating a fluidic input bore 537 extending through the head-end interface 400 providing for interface channel 538 to extend from an outer surface 559 of head-end interface 510 to piston channel 536. The liquid metallic alloy can be introduced at input 540, through interface channel 538, through fluidic input bore 537, through piston channel 536, and into conducting interface 534. Bore 438 may also be used to introduce air or other fluids into an inner volume 560, or annular space, of first piston conductor 512. In some examples, the fluid is pressurized air that is used to increase a pressure in inner volume 560, forcing first piston conductor 512 away from head-end interface 400.

Turning from the structure of work machine 100, conductor rod 500, and head-end interface 400 as illustrated in FIG. 5, FIG. 6 illustrates a method 600 involving these structures. FIG. 6 is a flowchart of a representative method 600 for using multi-tiered head-end interface of a rod conductor rod to power a work. As shown in FIG. 6, at step 602 at least a proximal end of a conductor rod 500 is secured to a work machine. For example, step 602 may be performed by connecting cylinder conductors 502, 504, and 506 to head-end interface 400 using terminal connectors. As discussed in detail above, work machine 100, such as a hauling truck at a mining site, can include conductor rod 106 with a plurality of conductive tubes, typically made of an aluminum alloy, arranged concentrically around a longitudinal axis. Near a head 122 of conductor rod 106 proximal to work machine 100, head-end interface 400 is integrated into conductor rod 500, as reflected in FIG. 5. Conductor rod 500 can be mounted to work machine 100 in any convenient fashion depending on the implementation, including securing the conductor rod to work machine 100 in some situations to be stationary and in other situations to be rotational about its longitudinal axis.

Further, in a step 604, a distal end of conductor rod 500 is connected to a connector assembly, such as connector assembly 114 of FIG. 1. In step 604, piston conductors are affixed to connector assembly 114 of FIG. 1. For example, piston conductors 512-516 are affixed to connector assembly 114 of FIG. 1. Connecting cylinder conductors 502, 504, and 506 to head-end interface 400 and piston conductors 512-516 to connector assembly 114, when piston conductors 512-516 are slidably engaged to cylinder conductors 502-506 provide for a continuous electrical path from a power source, through connector assembly 114, piston conductors 512-516, cylinder conductors 502-506, into and through head-end interface 400.

In step 606, work machine 100 is electrically connected to head-end interface 400 using one or more terminal connectors and wire or cables. The head-end interface 400 is a multi-tier interface, meaning the electrical connection to each cylinder conductor through a terminal connector is at a different tier of head-end interface. To provide power to work machine 100, at step 608, connector assembly 114 is connected to power rail 108 via trailing arms 116 and contactor 118.

At step 610, electrical power is delivered through the terminal connectors into work machine 100. In some examples, trailing arms 116 are conductors coupled to contactor 118, each conducting voltage and current at a different electrical pole and corresponding to the conductors within conductor rod 106. The voltages are designed to service various loads in work machine 100, including electric engine 102 of work machine 100.

In step 612, a pneumatic connection is established with a bore, such as bore 438 of FIG. 5, positioned at a longitudinal end of the head-end interface. The connection with bore 438, in the illustrated examples, provides passage for pressurized air into cavities within conductor rod 500 for providing forces to move or position arm 110 with respect to barrel 109.

Figure 7:
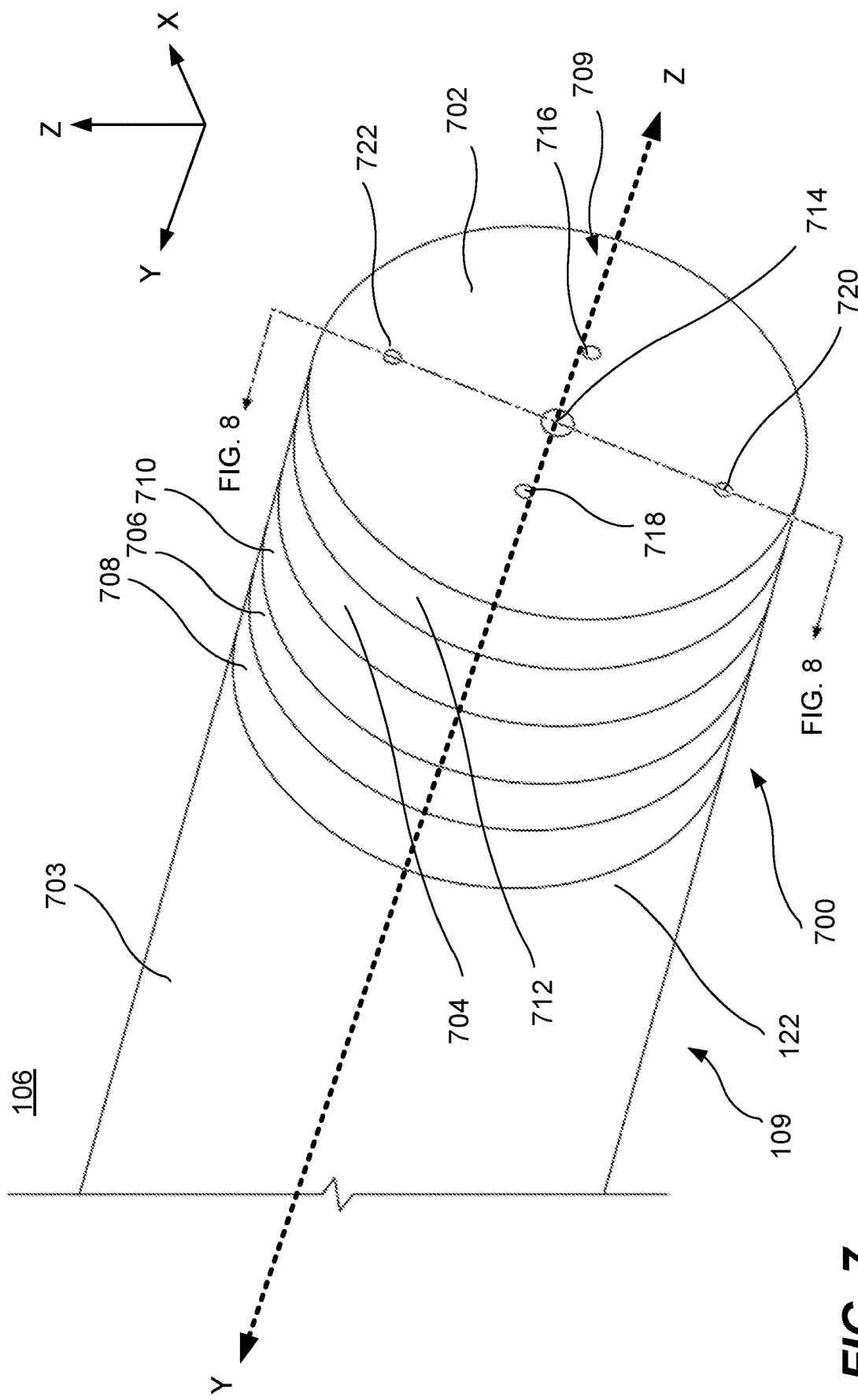
FIG. 7 is a partial isometric rear view of a conductive rod and head-end interface in accordance with an example of the present disclosure.
Figure 8:
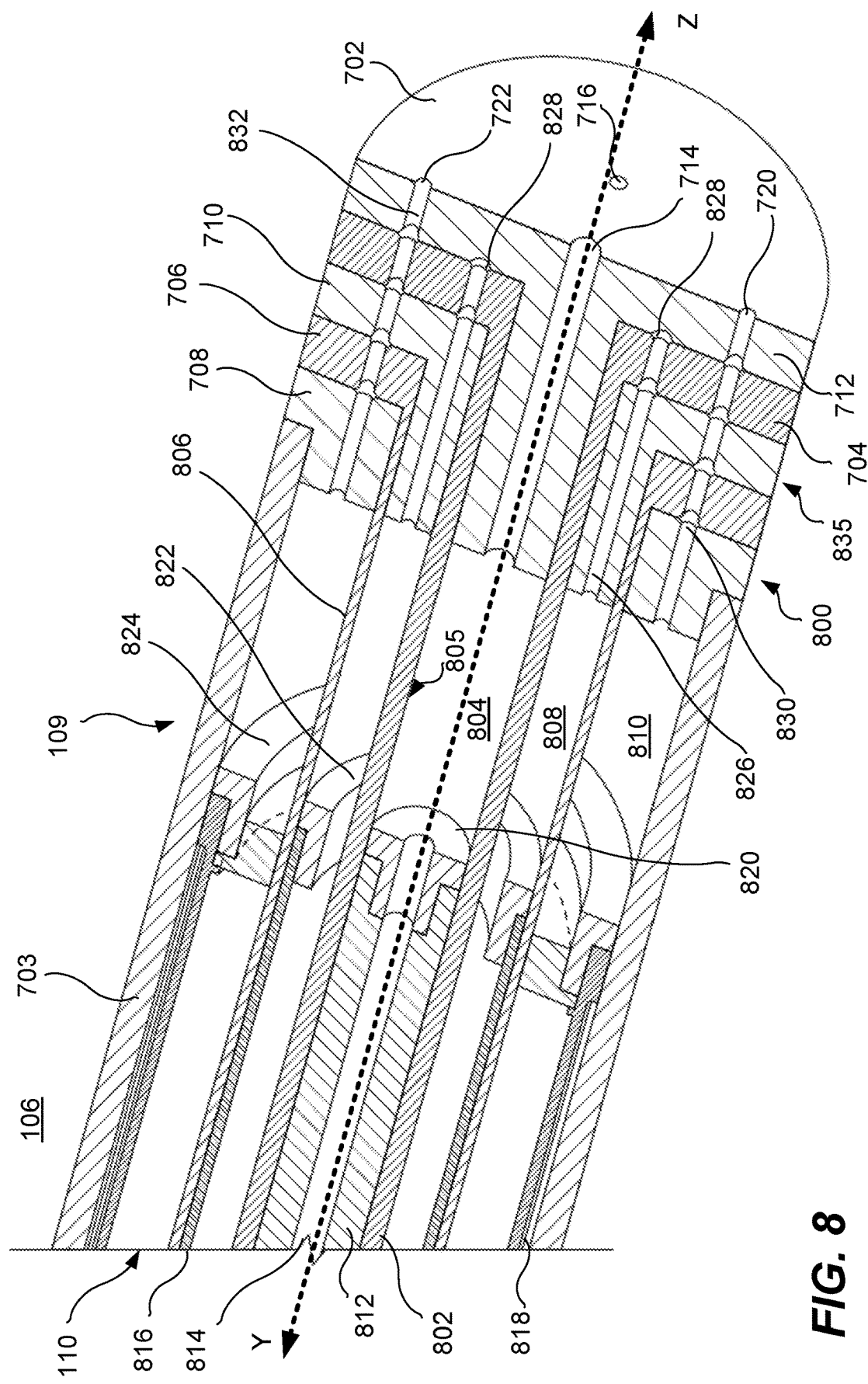
FIG. 8 is an isometric view of a longitudinal section of the conductive rod and connector of FIG. 8 in accordance with an example of the present disclosure.

While FIGS. 1-6 illustrate a first example of head-end interface 120, FIGS. 7 and 8 depict a second example of a head-end interface 700 for use with work machine 100. Head-end interface 700 includes structural features that enable electrical connection with conductor rod 106 radially around its exterior, as well as pneumatic connection with conductor rod 106 axially through an interface end 702. Head-end interface 700, with an interface on the circumference of conductor rod 106, provides radial access for passing electrical power from conductor rod 106 to work machine 100 and enables continued electrical conductivity during rotation of conductor rod 106 around a longitudinal central axis YZ. FIG. 7 is a view of a portion of conductor rod 106). FIG. 8 is a longitudinal section of conductor rod 106 along the cut lines shown in FIG. 7, revealing internal conductors, cavities, and conduits as discussed below.

Referring first to FIG. 7, conductor rod 106 includes head-end interface 700 connected to head 122 of barrel 109. Barrel 109 has an outer shell 703 around its exterior, which may be a conductive material having mechanical rigidity, such as an aluminum alloy. In some implementations, outer shell 703 serves as an electrical grounding path for conductor rod 106. Radially around its exterior, head-end interface 700 includes rings of conductive material, specifically first metallic contact 704 and second metallic contact 706. First metallic contact 704 and second metallic contact 706 are connected within head-end interface 700 to conductors extending longitudinally within conductor rod 106 that carry electrical power from power rail 108. First metallic contact 704 and second metallic contact 706 function as interfaces for the electrical power from power rail 108 to work machine 100. The example depicted in FIG. 7 contains two contacts as first metallic contact 704 and second metallic contact 706 corresponding to two conductors within conductor rod 106. In other examples, more or fewer conductors and contacts may be used to correspond to the arrangement of conductors within conductor rod 106. For instance, a version of head-end interface 700 not shown could employ one or more rings of conductive material in addition to first metallic contact 704 and second metallic contact 706.

Separators in the form of an insulative material such as plastic are positioned longitudinally between first metallic contact 704 and second metallic contact 706. First separator 708, for instance, serves as a structural interface between head-end interface 700 and head 122 of barrel 109, while electrically separating outer shell 703 and second metallic contact 706. Second separator 710 spaces first metallic contact 704 from second metallic contact 706. Third separator 712 acts as an endcap for head-end interface 700, while providing insulation longitudinally for first metallic contact 704. As shown in FIG. 7, third separator 712 has an annular shape and includes interface end 702 having a surface 709 extending perpendicular from central axis YZ and forming a structural terminus for conductor rod 106. The insulative material of third separator 712 can serve to protect equipment and personnel from voltages present on first metallic contact 704 and second metallic contact 706 present farther inward longitudinally along central axis YZ on conductor rod 106. Thus, in some examples, first separator 708, second separator 710, and third separator 712 help electrically insulate first metallic contact 704, and second metallic contact 706, and provide structural and mechanical form to head-end interface 700.

When installed on work machine 100, conductor rod 106 enables electrical connection radially via one or more of first metallic contact 704 and second metallic contact 706. Extending around a circumference of head-end interface 700, first metallic contact 704 and second metallic contact 706 of head-end interface 700 can provide a substantial surface area for interfacing electrical power from conductor rod 106 to work machine 100 with a high level of conductivity. A mating mechanism (not shown) within work machine 100 can grasp or otherwise contact first metallic contact 704 and second metallic contact 706 around the exterior of head-end interface 700. In addition, in some examples, first metallic contact 704, second metallic contact 706, and the mating mechanism may facilitate a sliding connection. For instance, in implementations where conductor rod 106 rotates about central axis YZ, such as to enable vertical movement of trailing arms 116, first metallic contact 704 and second metallic contact 706 permit head-end interface 700 to stay in electrical contact with a mating mechanism while the rotation occurs, ensuring the continued delivery of electrical power to work machine 100.

FIG. 7 further illustrates a pneumatic interface within interface end 702 of third separator 712. In general, third separator 712 includes one or more openings through interface end 702 in which pressurized air may be passed axially to the inside of conductor rod 106 from a compressor within work machine 100. The pressurized air may be used as an energy source to drive mechanical movement of conductor rod 106. In some examples, the pressurized air can be used in a pneumatic control system to force nested conductor tubes within conductor rod 106 to move axially with respect to each other, such as when arm 110 is forced to slide axially with respect to barrel 109. In other examples, the pressurized air can be routed through conductor rod 106 to be used near or beyond tip 124, such as to provide force relating to contactor 118 on power rail 108. As embodied in FIG. 7, the openings for pressurized air through interface end 702 include center bore 714, first middle bore 716, second middle bore 718, first outer bore 720, and second outer bore 722, which are explained below with respect to FIG. 8. Center bore 714 is at an axial center of head-end interface 700 along the central axis YZ. In some examples, such as shown in FIG. 7, first middle bore 716 and second middle bore 718 are positioned a first radial distance outward from the central axis YZ, while first outer bore 720 and second outer bore 722 are located a second radial distance outward from the central axis YZ, where the second radial distance is greater than the first radial distance.

FIG. 8, which is a longitudinal section of conductor rod 106 in FIG. 7, illustrates the internal structure of barrel 109 and head-end interface 700. FIG. 8 reveals that the contactor rings 800 on the exterior of head-end interface 700, which are first metallic contact 704 and second metallic contact 706, are annular-shaped rings or discs that connect with a respective tubular conductor and extend radially for a portion through the interior of head-end interface 700. For instance, a first barrel conductor 802 is a metallic material such as an aluminum alloy in the shape of a tube or a hollow cylinder centered axially along the central axis YZ. A first barrel cavity 804 is defined by an inner surface 805 of first barrel conductor 802. First barrel conductor 802 is a central conductor within barrel 109 and, in the example of FIG. 8, terminates longitudinally in the direction of Y of central axis YZ axis into first metallic contact 704. First barrel conductor 802 and first metallic contact 704 are configured to be substantially orthogonal to each other, and together provide a conductive path for electrical voltage radially from an interior to an exterior of conductor rod 106. First metallic contact 704 extends from first barrel conductor 802 to an outer surface 835 of head-end interface 700, as shown, where mechanical and electrical connection can be made to work machine 100. In one example, first barrel conductor 802 and first metallic contact 704 conduct +1500 VDC from within barrel 109 to first metallic contact 704 at an exterior of conductor rod 106. In some examples, first metallic contact 704 and first barrel conductor 802 are the same material and structure, although they may be different substances or separate pieces connected together. In general, first barrel conductor 802 and first metallic contact 704 form a shape resembling a tubular pole (first barrel conductor 802) arranged along central axis YZ with a flat base or endplate (first metallic contact 704) positioned along the X axis.

Similarly, second barrel conductor 806 is a conductor formed of a metallic material such as an aluminum alloy in the shape of a tube or a hollow cylinder as part of barrel 109. Second barrel conductor 806 is axially centered along central axis YZ and concentrically positioned surrounding first barrel conductor 802. A distance between the concentric tubes of first barrel conductor 802 and second barrel conductor 806 results in second barrel cavity 808. Radially outside second barrel conductor 806 and within an outer shell 703 of barrel 109 is third barrel cavity 810. Second barrel conductor 806 terminates longitudinally in the direction Y of the YZ axis in FIG. 8 into second metallic contact 706, which is substantially orthogonal with second barrel conductor 806. Together, second barrel conductor 806 and second metallic contact 706 form a conductive path for electrical voltage, such as −1500 VDC from within barrel 109 to second metallic contact 706 at an exterior of conductor rod 106. In some examples, second metallic contact 706 and second barrel conductor 806 are the same material and structure, although they may be different substances or separate components connected together. As with first barrel conductor 802 and first metallic contact 704, second barrel conductor 806 and second metallic contact 706 collectively form a shape resembling a tubular pole arranged along the central axis YZ having a flat base or endplate positioned along the X axis.

FIG. 8 further illustrates a portion of arm 110 nested within outer shell 703 and barrel 109. Specifically, arm 110 includes first arm conductor 812 arranged axially along the central axis YZ. First arm conductor 812 is a conductor made of a metallic material such as an aluminum alloy and has a tubular or hollow cylinder shape. An outer diameter of first arm conductor 812 is sized so that first arm conductor 812 contacts an inner surface of first barrel conductor 802 and yet can slide axially into the annular first barrel cavity 804. The tubular configuration of first arm conductor 812 leads to a central arm cavity 814 along the axial center of first arm conductor 812. The combination of central arm cavity 814 and first barrel cavity 804 provides a central passageway of open space longitudinally within conductor rod 106. Similarly, arm 110 includes a second arm conductor 816 as a tube-shaped conductive element arranged concentrically around first arm conductor 812. Second arm conductor 816, which may also be an aluminum alloy or another material having an acceptable level of electrical conductivity and mechanical resilience, has an outer diameter sufficient to cause contact with an inner diameter of second barrel conductor 806. At the same time, the sizing of second arm conductor 816 and second barrel conductor 806 are such that second arm conductor 816 may freely slide within second barrel conductor 806 and move into second barrel cavity 808 during retraction of arm 110.

Finally, in the example of FIG. 8, arm 110 includes third arm conductor 818. Third arm conductor 818 is also a conductive material such as an aluminum alloy and is sized to slide in contact within an inner diameter of outer shell 703. In a position of retraction for arm 110, third arm conductor 818 will slide into third barrel cavity 810 within barrel 109. The axial ends of first arm conductor 812, second arm conductor 816, and third arm conductor 818 leading into barrel 109 are respectively covered by first arm cap 820, second arm cap 822, and third arm cap 824. First arm cap 820 essentially fills the radial diameter of first barrel cavity 804 within first barrel conductor 802 but for central arm cavity 814. Second arm cap 822 substantially fills the radial distance of second barrel cavity 808 (i.e., the distance between the outer diameter of first barrel conductor 802 and the inner diameter of second barrel conductor 806). Third arm cap 824 substantially fills the radial distance of third barrel cavity 810 (i.e., the distance between the outer diameter of second barrel conductor 806 and the inner diameter of outer shell 703).

Head-end interface 700 further includes a series of bores and passageways through which pressurized air may be delivered within at least barrel 109. As arm 110 is axially slidable within barrel 109, pressurized air from a pneumatic control system may provide forces to cause the extension or retraction of arm 110. As noted above, the pressurized air is provided to conductor rod 106 from work machine 100 through interface end 702. As shown in FIG. 8, center bore 714 passes from interface end 702 along the central axis YZ and into first barrel cavity 804. As first barrel cavity 804 and central arm cavity 814 adjoin each other in forming a central passageway through conductor rod 106, center bore 714 serves to feed pressurized air from work machine 100 into barrel 109 and along the length of arm 110, possibly to tip 124. First outer bore 720 and second outer bore 722 provide passageways for pressurized air to enter third barrel cavity 810 of barrel 109. In some examples, the pressurized air within third barrel cavity 810 provides an axial force against third arm cap 824 that, depending on other pneumatic forces acting on arm 110, may affect the movement of arm 110 axially within barrel 109.

Likewise, first middle bore 716 and second middle bore 718 (not shown in FIG. 8) provide passageways for pressurized air to enter second barrel cavity 808 of barrel 109. First middle bore 716 and second middle bore 718 in some implementations are in the same plane as center bore 714, first outer bore 720, and second outer bore 722, namely, the longitudinal section shown in FIG. 8. As illustrated in FIG. 8, however, in other implementations first middle bore 716 and second middle bore 718 are offset angularly about the central axis YZ with respect to first outer bore 720 and second outer bore 722. In some examples, first middle bore 716 and second middle bore 718 are each about 90 degrees apart from first outer bore 720 and second outer bore 722, although other angles are within the scope of this disclosure. This angular offset may, for instance, provide room between each of the bores along interface end 702 for connection of equipment to supply the pressurized air.

In some examples, one or more of first metallic contact 704, second metallic contact 706, first separator 708, second separator 710, and second separator 710 include ringed conduits to provide passageways for pressurized air circumferentially around the central axis Y-Y from where axial bores radially enter interface end 702. For instance, at the upper right in FIG. 8, second outer bore 722 provides access for pressurized air into conductor rod 106 that leads into third barrel cavity 810. Third ringed conduit 832 intersects with second outer bore 722 and forms a pathway (not shown) of circular or similar shape for the pressurized air to travel about axis Y-Y (i.e., in the X-Z plane). At the lower right in FIG. 8, third ringed conduit 832 intersects first outer bore 720. Similarly, first middle bore 716 extends longitudinally parallel to central axis YZ and intersects with first ringed conduit 828 within third separator 712. From first ringed conduit 828, the pressurized air can pass through internal middle bore 826 and into second barrel cavity 808. Second ringed conduit 830 provides an additional example of a pneumatic connection or pathway made from a radial position of first outer bore 720 and second outer bore 722 circumferentially around head-end interface 700 (i.e., in the X-Z plane). The various ringed conduits may be made as grooves within longitudinal sides of first metallic contact 704 or second metallic contact 706 or within first separator 708, second separator 710, or third separator 712. Moreover, additional bores connecting from one or more of the ringed conduits may be present within head-end interface 700 to provide other paths for pressurized air to enter any one of first barrel cavity 804, second barrel cavity 808, or third barrel cavity 810.

In addition, although discussed in terms of pneumatic control, one or more of center bore 714, first middle bore 716, second middle bore 718, first outer bore 720, or second outer bore 722 could be used to facilitate the passage of signals into conductor rod 106. For instance, conductor rod 106 could contain electrical sensors or controls, such as for monitoring its position, temperature, or movement, and signals relating to those activities may be passed through interface end 702 via the one or more bores. The signals could be passed optically using line-of-sight arrangements, such as through center bore 714, first barrel cavity 804, and central arm cavity 814, or they could be passed through wires, optical fibers, or other media. Additional orifices within interface end 702 and through head-end interface 700 could be added to facilitate the passage of electrical or optical signals as desired without departing from the principles discussed.

Therefore, the example head-end interface 700 in FIGS. 7 and 8 provides a structure configured to enable work machine 100 to have an electrical connection radially with conductor rod 106 and a pneumatic connection axially. The electrical connection can provide sufficient power to operate electric engine 102, while the pneumatic connection can deliver pressurized air to selective cavities within conductor rod 106 to cause at least axial movement of arm 110 with respect to barrel 109. Moreover, head-end interface 700 provides a configuration sufficient, if desired for the implementation, for conductor rod 106 to rotate about its longitudinal axis while maintaining electrical connection between head-end interface 700 and work machine 100.

Turning from the structure of work machine 100, conductor rod 106, and head-end interface 700 as illustrated in FIGS. 7 and 8 to a method 900 for powering a work machine from a moveable conductive rod. As shown in FIG. 9, at step 902 at least a proximal end of a rod of concentrically arranged tubular conductors is secured to a work machine. As discussed in detail above, work machine 100, such as a hauling truck at a mining site, can include conductor rod 106 with a plurality of conductive tubes, typically made of an aluminum alloy, arranged concentrically around a longitudinal axis. Near a head 122 of conductor rod 106 proximal to work machine 100, head-end interface 700 is integrated into conduction rod 106, as reflected in FIGS. 1, 7, and 8. Conductor rod 106 can be mounted to work machine 100 in any convenient fashion depending on the implementation, including securing the conductor rod to work machine 100 in some situations to be stationary and in other situations to be rotational about its longitudinal axis.

Further, in a step 904, an electrical connection is established with two or more ringed contacts positioned around the circumference of a head-end interface on the conductor rod. As implemented in the example of FIG. 7, head-end interface 700 includes first metallic contact 704 and second metallic contact 706 around the outside of conductor rod 106. According to step 904, connection is made between one or both of first metallic contact 704 and second metallic contact 706 and compatible contacts within work machine 100 at the radial sides of head-end interface 700. In step 906, a pneumatic connection is established with two or more bores positioned at a longitudinal end of the head-end interface. The two or more bores may include center bore 714, first middle bore 716, second middle bore 718, first outer bore 720, or second outer bore 722, for example. The connection with these bores, in the illustrated examples, provides passage for pressurized air into cavities within conductor rod 106 for providing forces to move or position arm 110 with respect to barrel 109.

In subsequent steps, the work machine is powered with electricity, and the conductor rod is power with pressurized air. Specifically, in step 906, a distal end of the rod is connected to a power rail providing electrical power. As shown in FIG. 1, the connection between contactor 118 and power rails 108 provides access for work machine 100 to electrical power present on power rails 108. In step 910, the electrical power is delivered through the two or more ringed contacts on the conductor rod to the electrical connection. As shown in part in FIG. 8, concentric conductor tubes convey the electrical power from power rail 108 through arm 110 and barrel 109 to the series of annular or disk-shaped terminals, first metallic contact 704 and second metallic contact 706. From those contacts, the electrical power may pass through a connection into work machine 100. In a step 912, pressurized air is delivered from the work machine through the pneumatic connection to the two or more bores. In some examples, the delivery of pressurized air through interface end 702 and into head-end interface 700 provides a means under a pneumatic control system to manipulate the position of at least arm 110. Accordingly, head-end interface 700 can provide an interface that enables radial attachment for electrical power and axial attachment for pneumatic power between conductor rod 106 and work machine 100, enabling the efficient powering of work machine 100 and conductor rod 106 including the flexibility to permit rotation of conductor rod 106 about its longitudinal axis as desired.

Those of ordinary skill in the field will also appreciate that the principles of this disclosure are not limited to the specific examples discussed or illustrated in the figures. For example, while conductor rod 106 for FIGS. 7 and 8 are illustrated with two conductors, three or more conductors may be employed following the principles explained in the present disclosure. In addition, the principles disclosed are not limited to implementation on a work machine. Any moving vehicle deriving electrical power from a ground-based conductor rail could benefit from the examples and techniques disclosed and claimed.

INDUSTRIAL APPLICABILITY

A head-end interface of the conductor rod proximate the work machine includes metallic rings spaced apart and extending circumferentially around the head-end interface. Bores pass longitudinally through the head-end interface and into annular cavities within the conductor rod between the concentric metal tubes. The metallic rings enable the delivery of electrical power radially from the conductor rod across substantial surface area for powering the work machine, while the bores enable the delivery of pneumatic power longitudinally into the conductor rod for powering axial movement of the conductor rod. As a result, the head-end interface enables radial connection to the conductor rod for electrical power with an option for rotating the conductor rod about its longitudinal axis.

As noted above with respect to FIGS. 7 and 8, an example conductor rod and head-end interface generally includes a conductor rod 106 that is extendable or retractable from a work machine 100. Conductor rod 106 includes a barrel 109 and an arm 110 axially moveable within barrel 109. A first conductor within barrel 109 includes a first barrel conductor 802 in the shape of a tube extending along a longitudinal axis and a first metallic contact 704 extending orthogonally from the first barrel conductor to an outer diameter of a head-end interface 700. A second conductor within barrel 109 includes a second barrel conductor 806 in the shape of a tube concentrically surrounding and separated from the first barrel conductor 802 by a second barrel cavity 808 and a second metallic contact 706 extending from the first barrel conductor to the outer diameter. The second metallic contact 706 is farther from the end of the conductor rod 106 than the first metallic contact 704. Orifices within the head-end interface 700 enable insertion of pressurized air from work machine 100 to the conductor rod 106.

In the examples of the present disclosure, the head-end interface 700 enables a radial connection to electrical contacts on the exterior of conductor rod 106. A first metallic contact 704 and second metallic contact 706 in the shape of rings permit engagement by work machine around the circumference of head-end interface 700, increasing conductive surface area between conductor rod 106 and work machine 100. Moreover, in implementations where conductor rod 106 may rotate about its longitudinal axis, the radial connection through first metallic contact 704 and second metallic contact 706 permits continued electrical connection and flow of electrical power during the rotation. Further, bores within an interface end 702 serve as passageways for pressurized air into head-end interface 700, which provide energy for pneumatically controlling extension and retraction of arm 110 with respect to barrel 109. Thus, with head-end interface 700, high levels of electrical power may be conducted from power rail 108 to work machine 100 while pressurized air provided into conductor rod 106 can help position arm 110.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An apparatus for conducting electrical energy, comprising:
   a rigid outer tube with a first end and a second end, the outer tube having an outer diameter and a longitudinal center defining an axis between the first end and the second end;
   a first conductor within the rigid outer tube, the first conductor comprising:
      a first metal tube; and
      a first metallic endplate, the first metal tube surrounding and extending along the axis from proximate the first end to the first metallic endplate, the first metallic endplate having a first longitudinal thickness extending orthogonally from the first metal tube to the outer diameter, and the first conductor further comprising a first bore through the first longitudinal thickness of the first metallic endplate; and
   a second conductor comprising a second metal tube and a second metallic endplate, the second metal tube concentrically surrounding and separated from the first metal tube by an annular space, the second metal tube extending from proximate the first end to the second metallic endplate, the second metallic endplate having a second longitudinal thickness extending orthogonally from the second metal tube to the outer diameter, the second metallic endplate being farther from the second end than the first metallic endplate.

2. The apparatus of claim 1, wherein a first outer edge of the first metallic endplate and a second outer edge of the second metallic endplate encircle the apparatus at the outer diameter.

3. The apparatus of claim 1, wherein the annular space comprises air.

4. The apparatus of claim 1, wherein the first bore is configured to pass pressurized air into the annular space.

5. The apparatus of claim 4, further comprising a second bore through the first longitudinal thickness of the first metallic endplate and through the second longitudinal thickness of the second metallic endplate, the second bore being configured to pass pressurized air into a region radially outside the second metal tube.

6. The apparatus of claim 5, further comprising an endcap on the second end of the rigid outer tube, the endcap comprising insulative material contacting the first metallic endplate on opposite sides of the first longitudinal thickness and contacting the second metallic endplate on opposite sides of the second longitudinal thickness.

7. The apparatus of claim 6, wherein the first bore passes through the endcap and the first longitudinal thickness.

8. The apparatus of claim 6, wherein the second bore passes through the endcap, the first longitudinal thickness, and the second longitudinal thickness.

9. A conductor assembly, comprising:
a first conductor comprising a first conductive tube and a first conductive annulus, the first conductive tube surrounding and extending along a longitudinal axis from a distal end to the first conductive annulus, the first conductive annulus having:
a first longitudinal thickness extending radially from the first conductive tube to an outer diameter; and
one or more bores through the first longitudinal thickness; and
a second conductor comprising a second conductive tube and a second conductive annulus, the second conductive tube being concentrically inside the first conductive tube and extending from the distal end to the second conductive annulus, the second conductive annulus having a second longitudinal thickness extending radially from the second conductive tube to the outer diameter, the second conductive annulus being farther from the distal end than the first conductive annulus.

10. The conductor assembly of claim 9, wherein the first conductive annulus has a first outer edge at the outer diameter, the first outer edge being a first terminal for electrical energy.

11. The conductor assembly of claim 10, wherein the second conductive annulus has a second outer edge at the outer diameter, the second outer edge being a second terminal for the electrical energy.

12. The conductor assembly of claim 11, further comprising an insulative casing surrounding the first conductive annulus and the second conductive annulus.

13. The conductor assembly of claim 12, wherein the outer diameter comprises, in a direction parallel to the longitudinal axis toward the distal end, a first width of the insulative casing, the second outer edge, a second width of insulative casing, the first outer edge, and a third width of insulative casing.

* * * * *